United States Patent
Sozzani

(10) Patent No.: US 7,936,875 B2
(45) Date of Patent: May 3, 2011

(54) PROTECTION OF A DIGITAL QUANTITY CONTAINED IN AN INTEGRATED CIRCUIT COMPRISING A JTAG INTERFACE

(75) Inventor: Fabio Sozzani, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 1267 days.

(21) Appl. No.: 11/481,099

(22) Filed: Jul. 5, 2006

(65) Prior Publication Data

US 2007/0088985 A1    Apr. 19, 2007

(30) Foreign Application Priority Data

Jul. 5, 2005  (FR) ...................................... 05 52043

(51) Int. Cl.
*H04L 9/00* (2006.01)
(52) U.S. Cl. .............. 380/44; 713/193; 713/194; 726/2; 726/26; 714/25; 714/30; 714/733; 714/734; 702/117
(58) Field of Classification Search .................. 713/1, 2, 713/188, 194, 193; 380/200, 201, 255, 277, 380/44; 726/2, 26; 714/25, 30, 733, 734; 702/117
See application file for complete search history.

(56) References Cited

U.S. PATENT DOCUMENTS

| | | | | |
|---|---|---|---|---|
| 4,849,927 A * | 7/1989 | Vos | ............................. | 235/382.5 |
| 5,386,154 A * | 1/1995 | Goetting et al. | ................ | 326/44 |
| 5,554,891 A * | 9/1996 | Shimizu et al. | | |
| 5,560,337 A * | 10/1996 | Bolander et al. | | |
| 5,649,149 A * | 7/1997 | Stormon et al. | ............. | 711/108 |
| 5,805,609 A * | 9/1998 | Mote, Jr. | | |
| 6,266,271 B1 * | 7/2001 | Kawamura | ............... | 365/185.04 |
| 6,424,713 B1 * | 7/2002 | Sprunk | | |
| 6,463,554 B1 * | 10/2002 | Budelman et al. | | |
| 6,463,560 B1 * | 10/2002 | Bhawmik et al. | | |
| 6,526,144 B2 * | 2/2003 | Markandey et al. | ............ | 380/28 |
| 6,785,173 B2 * | 8/2004 | Sohn et al. | ..................... | 365/201 |
| 6,834,366 B2 * | 12/2004 | Kim et al. | | |
| 6,853,597 B2 * | 2/2005 | Jain | | |
| 6,944,778 B2 * | 9/2005 | Walter et al. | | |
| 7,007,108 B2 * | 2/2006 | Emerson et al. | .................. | 710/4 |
| 7,119,524 B2 * | 10/2006 | Bretz et al. | | |
| 7,149,862 B2 * | 12/2006 | Tune et al. | ..................... | 711/163 |
| 7,266,848 B2 * | 9/2007 | Moyer et al. | | |

(Continued)

FOREIGN PATENT DOCUMENTS

EP    1 443 338 A1    8/2004

OTHER PUBLICATIONS

French Search Report from corresponding French Application No. 0552043, filed Jul. 5, 2005.

(Continued)

*Primary Examiner* — Joseph Thomas
*Assistant Examiner* — Joseph Pan
(74) *Attorney, Agent, or Firm* — Lisa K. Jorgenson; James H. Morris; Wolf, Greenfield & Sacks, P.C.

(57) ABSTRACT

A method and a circuit for protecting a digital quantity stored in a microcontroller including a JTAG interface, including the step of making the digital quantity dependent from a value stored in non-volatile fashion in the microcontroller and made inaccessible if signals are present at the input of the JTAG interface.

16 Claims, 2 Drawing Sheets

U.S. PATENT DOCUMENTS 7,334,173 B2 * 2/2008 Morgan et al.
2004/0051587 A1 * 3/2004 Cha ............................ 330/255
2004/0117575 A1   6/2004 Link et al.
2004/0158784 A1 * 8/2004 Abuhamdeh et al. ......... 714/724
2004/0193980 A1   9/2004 Avery et al.
2005/0289355 A1 * 12/2005 Kitariev et al.

OTHER PUBLICATIONS

Nick Patavalis: "A Brief Introduction to the JTAG Boundary Scan Interface" [Online] Nov. 8, 2001, XP002375442 Extrait de l'Internet: URL:http://www.inaccessnetowrks.com/projects/ianjtag/jtag-intro/jtag-intro.html>[extrait le 2006-004-03] p. 1-p. 5.

* cited by examiner

PROTECTION OF A DIGITAL QUANTITY CONTAINED IN AN INTEGRATED CIRCUIT COMPRISING A JTAG INTERFACE

BACKGROUND OF THE INVENTION

1. Field of the Invention

The present invention generally relates to integrated circuits and more specifically to circuits comprising an interface of JTAG type.

The present invention more specifically applies to integrated circuits intended to contain one or several digital quantities to be protected against an access from the outside, especially keys used in ciphered or signed exchanges by means of cryptography algorithms.

2. Discussion of the Related Art

FIG. 1 is a schematic block diagram of an example of an integrated circuit 1 with a microcontroller of the type to which the present invention applies. This circuit comprises a JTAG interface (Joint Test Action Group), the architecture of which is defined by a standard IEEE 1149 (Standard Test Access Port and Boundary-Scan Architecture). This standard defines a series protocol with five terminals for accessing to and controlling signal levels on the input/output terminals of a digital circuit. In the example shown in FIG. 1, circuit 11 to be tested (CORE) communicates with the outside through three input/output terminals 12, 13, and 14. For simplification, the case of three terminals 12 to 14 is considered, but the microcontroller may comprise many other accesses.

The general structure of the JTAG interface comprises elements 15 and 16 for branching the signals between input/output terminals 12, 13, and 14 and circuit 11 to be tested to branch the signals present on the input/output terminals either to circuit 11, or to a third element 17 of the JTAG interface (JTAG IF) especially comprising logic test circuits. Circuit 17 communicates with the outside of circuit 1 by means of five terminals carrying signals TDI, TCK, TRIS, TRST, and TDO of the JTAG protocol. Signals TDI, TCK, TRIS, and TRST correspond to respective inputs of data reception (TDI), of a clock signal (TCK), of a signal (TRIS) of mode selection between the test mode and the normal operation mode, and of a reset signal (TRST). The fifth signal (TDO) corresponds to an output towards an external tool of interpretation of the performed test.

By default, circuit 1 is in a normal operation in which deviation elements 15 and 16 are inoperative, core 11 of circuit 1 then communicating with input/output terminals 12 to 14. In test phase, by the activation of circuit 17, signal branching circuits 15 and 16 enable redirecting either signals present at the input of terminals 12 to 14, or signals present at the output of the terminals of circuit 11, towards circuit 17 for outputting through terminal TDO and interpretation by the test tools (not shown).

The operation of a JTAG interface is known by the above-indicated standard and an example of the circuit of FIG. 1 is discussed in article "Brief Introduction to the JTAG Boundary Scan Interface" by Nick Patavalis, published on Nov. 8, 2001 on Internet page http://www.inaccessnetworks.com/ian/projects/ianjtag/jtag-inro/jtag-intro.html.

A problem linked to the use of a JTAG interface is that it forms an element likely to have access to digital quantities contained in microcontroller 11 which would be desired to be preserved from an access from the outside. These quantities for example are ciphering, authentication keys, etc. which are considered as secret and having to remain within the circuit. The JTAG interface of a microcontroller may indeed enable a person attempting to fraud to have access to such information, be they contained in the actual integrated circuit (in the microcontroller) or in a secure memory external thereto and with which it communicates over a bus.

FIG. 2 is a functional representation of an example of a microcontroller 1 equipped with a JTAG interface 17'. To simplify the representation of FIG. 2, the branching elements (15 and 16, FIG. 1) have not been illustrated. Circuit 1 forms a microcontroller for example comprising a central processing unit 21 (CPU), a non-volatile memory 22 (ROM), for example, of read-only memory type, a RAM 23 (MEM) for the execution of the programs, and a cryptographic function 24 (CRYPTO-FCT). Function 24 generally is a program or a circuit (cryptoprocessor) handling quantities considered as having to remain secret, be it for ciphering, signature, authentication purposes, etc. The different components of circuit 1 communicate by means of an internal bus 25 over which data, addresses, and control signals transit. Bus 25 communicates with the outside through input/output ports (not shown). In the example of FIG. 2, a flash memory 3 (FLASH) is connected to bus 25 by these input/output ports.

According to a first example, a secret key is contained in memory 22 and can be used by cryptoprocessor 24 to process secret data contained in external memory 3. In this case, the secret key transits from ROM 22 to processor 24 through bus 25. Now, this bus is accessible through JTAG interface 17', which introduces a possible flaw in the system security.

According to another example, a key is generated by the microcontroller from: an identifier for example contained in central processing unit 21; digital elements contained in ROM 22; and other cryptographic elements contained, for example, in an additional element 26 (for example, a key conditioning rights of access to certain applications). Here again, the fact for all quantities to pass through bus 25 accessible through JTAG interface 17' weakens the system in terms of preservation of the secret of the handled quantities.

European patent application EP-A-1443338 provides adding to the JTAG interface a user authentication mechanism to control the access thereto.

A first disadvantage of this technique is that it requires significant hardware resources.

Another disadvantage is that it provides access to the elements to be protected if the user passes the control.

SUMMARY OF THE INVENTION

The present invention aims at overcoming all or part of the disadvantages linked to the use of a JTAG interface in microcontrollers in which some data must not be made accessible by a user or a person attempting to fraud.

The present invention especially aims at preventing the provision to the outside of the circuit, through the JTAG interface, of data considered as having to remain within the microcontroller.

The present invention also aims at providing a solution compatible with the generation of a key within the microcontroller.

The present invention also aims at providing a solution compatible with conventional JTAG interfaces.

The present invention also aims at providing a solution requiring few hardware resources in the integrated circuit.

To achieve all or part of these objects as well as others, the present invention provides a method for protecting a digital quantity stored in a microcontroller comprising a JTAG interface, in which said digital quantity is made dependent from a value stored in non-volatile fashion in the microcontroller and made inaccessible if signals are present at the input of the JTAG interface.

According to an embodiment of the present invention, said value is a parameter of generation of a key used by a cryptographic function of the microcontroller.

According to an embodiment of the present invention, a second value different from the first one is used to generate the key of the cryptographic function when signals are present at the input of the JTAG interface.

According to an embodiment of the present invention, the protection is deactivated in a test phase using the JTAG interface.

The present invention also provides a microcontroller comprising at least a central processing unit, a non-volatile storage element, and a JTAG-type interface, further comprising means for implementing a function of protection of a digital quantity by making said quantity dependent on a parameter accessible only in the absence of signals present at the input of the JTAG interface.

According to an embodiment of the present invention, a cryptographic function uses a key having a parameter stored in a non-volatile storage element and only accessible in the absence of signals at the input of the JTAG interface.

According to an embodiment of the present invention, said function is implemented by means of an element of detection of the presence of a signal at the input of the JTAG interface to condition a value provided to generate said key.

The foregoing and other objects, features, and advantages of the present invention will be discussed in detail in the following non-limiting description of specific embodiments in connection with the accompanying drawings.

DETAILED DESCRIPTION

Figure 1:
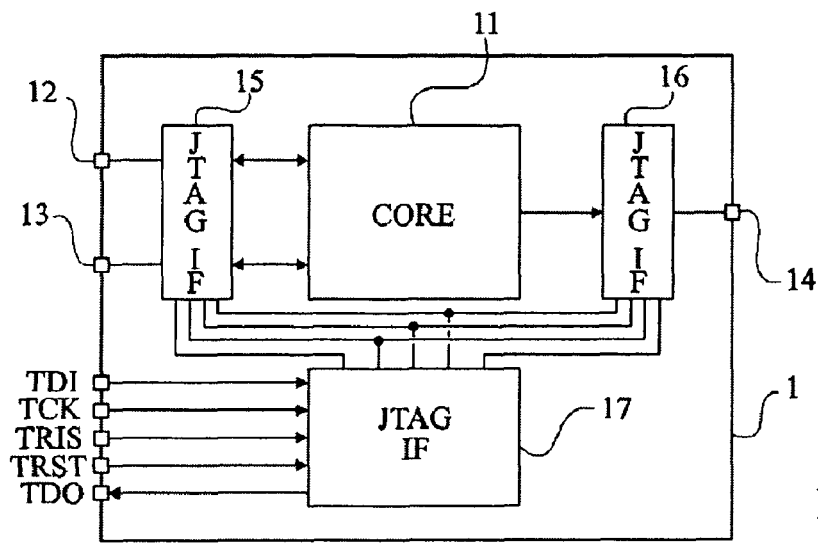
FIGS. 1 and 2, previously described, show the state of the art and the problem to solve.

The same elements have been designated with the same reference numerals in the different drawings. For clarity, only those steps and elements which are useful to the understanding of the present invention have been shown in the drawings and will be described hereafter. In particular, the tasks executed by the microcontroller contained in an integrated circuit of the present invention have not been detailed, the present invention being compatible with any conventional microcontroller. Further, the destination of the quantities supposed to remain secret within the microcontroller have not been detailed, the present invention being here again compatible with any conventional use of a digital quantity intended to remain secret (authentication, signature, ciphering, etc.).

A feature of an embodiment of the present invention is to add, to a digital quantity contained in a non-volatile memory of a microcontroller of a circuit comprising a JTAG interface, a parameter having a different value according to the operating mode of the integrated circuit between a normal operation mode and a test mode exploiting the JTAG interface.

Preferably, a circuit according to the present invention comprises a storage element (for example, a register) having a value which changes according to whether the JTAG interface has or not been used for the test. This element is then used by the microcontroller (in software or hardware fashion) like a cryptographic key parameter.

The present invention takes advantage from the fact that at each beginning of a test by means of a JTAG interface, one of the signals of this interface is always present. This enables not only easily detecting an attempt of access through the JTAG interface, but also updating the value of the storage element to validate that it is or not a test.

The JTAG interface is in itself not modified and all its functionalities are preserved. The present invention only exploits information present on one of the interface signals for cryptographic purposes.

Figure 2:
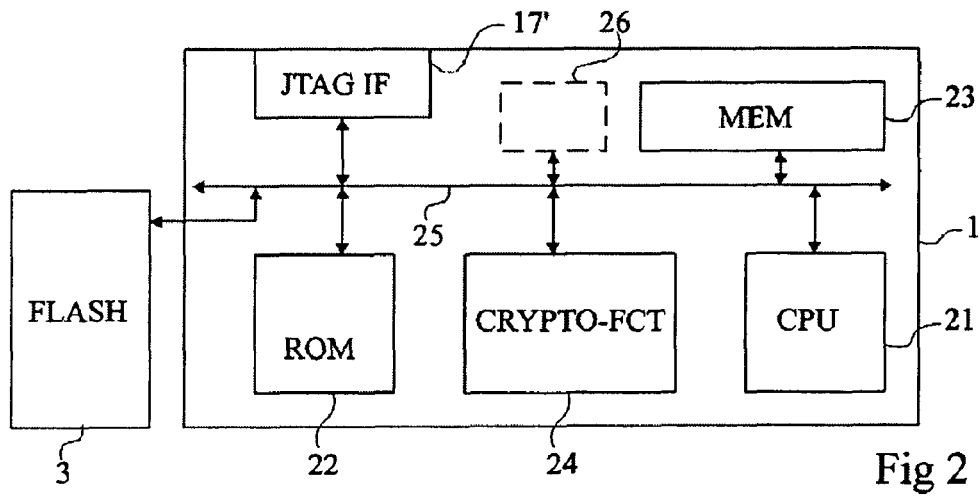
Figure 3:
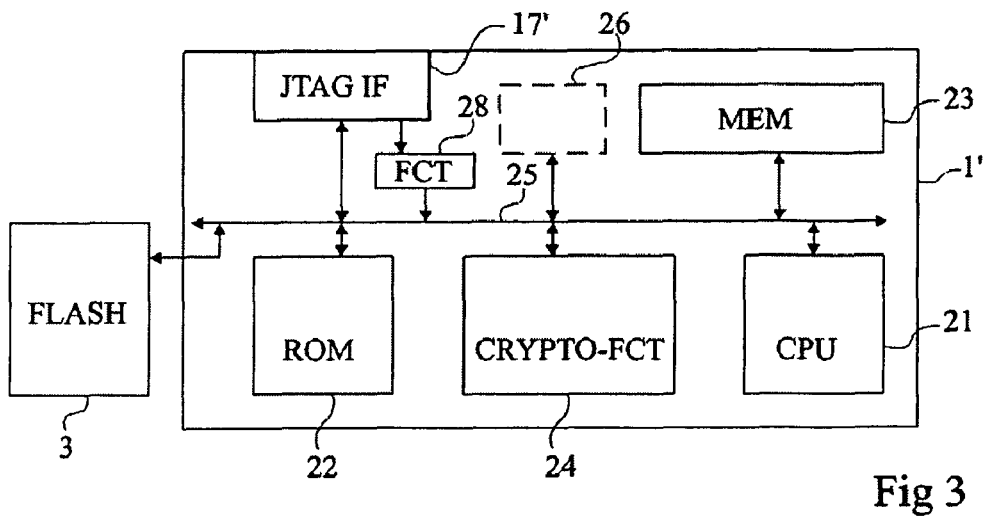
FIG. 3 is a schematic block diagram of an embodiment of an integrated circuit with a microcontroller and a JTAG interface according to the present invention.

FIG. 3 is a schematic block diagram, in a view to be compared with that of FIG. 2, of an embodiment of an integrated circuit 1' of microcontroller type comprising a JTAG interface according to the present invention.

As previously, circuit 1' comprises a central processing unit 21 (CPU), at least one non-volatile memory 22 (for example, a ROM), at least one volatile memory 23 (MEM), a JTAG interface 17' (JTAG IF), and a cryptographic function 24 (CRYPTO-FCT). In the shown example, the different elements communicate over an internal bus 25 having an input/output circuit (not shown) connected to an external memory 3 (FLASH), for example, of flash type, or more generally to other external elements of circuit 1'. Optionally and according to the function of the key stored in ROM 22, one or several additional elements 26 are provided as in the embodiment of FIG. 2.

According to this embodiment of the present invention, a function 28 (FCT) is interposed between JTAG interface 17' and the rest of the system to generate a parameter taken into account in at least one digital quantity intended to remain protected in circuit 1. The value of this quantity differs according to the JTAG operating mode (normal or test) of the circuit. To better show that the present invention does not modify the operation of the JTAG interface, block 28 is shown between interface 17' and bus 25 without however interfering on a direct connection of interface 17' to bus 25.

Figure 4:
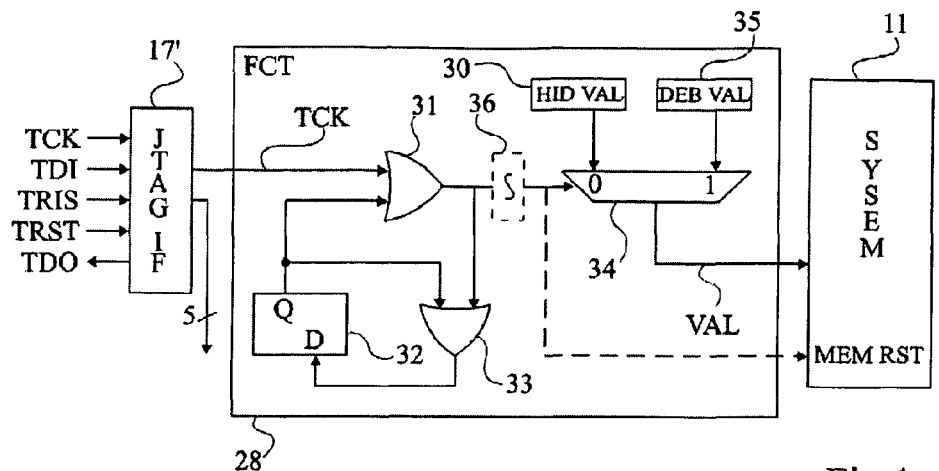
FIG. 4 shows a detail of the circuit of FIG. 3.

FIG. 4 is a schematic block diagram of an embodiment of function 28 according to the present invention. This function may be at least partially implemented in software fashion but requires an element 30 for storing a value (HID VAL) stored on non-volatile manufacturing and the state of which conditions, when the circuit operates in normal mode, the obtaining of a correct digital quantity to be protected (for example, a ciphering or authentication key). This amounts to hiding in the circuit a value on which the obtaining of correct keys will then depend.

In a hardware implementation, function 28 comprises, for example, a multiplexer 34 having a first input receiving value HID-VAL and having a second input receiving another value DEB-VAL. The output of multiplexer 34 provides the system symbolized by a block 11 in FIG. 4 (typically, central processing unit 21 or hardware or software cryptographic function 24) with a value VAL used to obtain the digital quantity to be protected. The selection between the multiplexer inputs is performed according to the operating mode (normal or test) of the circuit.

According to a first embodiment, the control input of the multiplexer is connected to the output of an OR gate 31 having a first input receiving signal TCK originating from JTAG interface 17'. A second input of gate 31 is connected to the Q data output of a flip-flop 32 having its input receiving the result of an OR-type combination (gate 33) of the Q output with the output of gate 31. Value VAL provided to system 11 thus depends on the presence of signals at the input of the JTAG interface. In this example, elements 31, 32, and 33 form an element for memorizing a bit indicative of the use of the JTAG interface. This amounts to memorizing the occurrence of a falling edge on signal TCK.

When the circuit is powered, without for the JTAG interface to be used, signal TCK is low. As a result, the output of gate 31 is low (the Q output of flip-flop 32 being at the low state at the turning on). Gate 33 and flip-flop 32 latch the low state at the output of gate 31 and multiplexer 34 selects hidden value HID-VAL.

As soon as the JTAG interface is used, a clock signal TCK is present. At the first rising edge of this signal, the output of gate 31 switches to the high state and multiplexer 34 selects value DEB-VAL. The generated key then is a key which is not critical in terms of security. Gate 33 also switches high, which latches the high state at the input of gate 31 and the same state at the output.

Optionally, an anti-fuse element 36 is interposed at the control input of multiplexer 34. The function of this element 36 is to enable deactivation of the protection for the case where the test mode needs the key generated in the integrated circuit, this key depending on value VAL. In this case, element 36 is activated (lets through the signal) at the end of the test, to activate the protection. In the case where the test mode does not need using the right cryptography key, anti-fuse element 36 is not necessary.

Preferably, value HID VAL contained in hidden register 30 is set on manufacturing, for example, in hardware form.

Value DEB VAL of element 35 is selected to be different from the hidden value of element 30. For example, a value having all its bits at zero or all its bits at one will be selected for the simplest implementation. The system can always read this value but since it is different from the value used to condition the key used by the cryptographic function, it is not possible to generate a correct cryptographic key from this parameter.

According to a simplified variation, if the value representing the key is sufficiently large in number of bits, it may be directly used without going through a hash function.

Figure 5A:
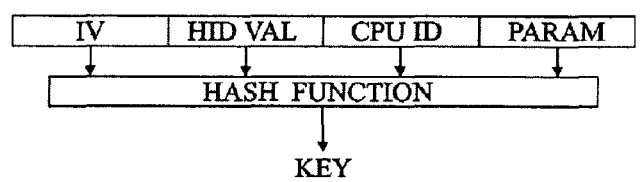
FIGS. 5A and 5B illustrate an embodiment of the present invention.
Figure 5B:
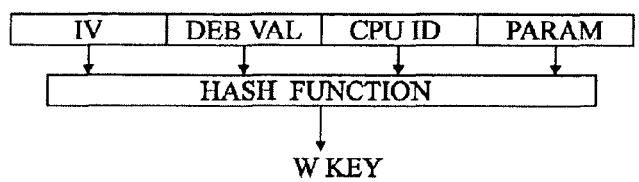

FIGS. 5A and 5B illustrate the generation of a key by means of a circuit according to an embodiment of the present invention.

It is assumed that a key KEY used by the cryptographic function of the microcontroller takes into account an initialization vector (IV) contained, for example, in the ROM, an identifier of the microcontroller (CPU ID) contained, for example, in a non-volatile memorization element of the circuit and, optionally, a parameter (PARAM) for example originating from circuit 26 of FIG. 3. This parameter for example corresponds to a parameterizing of the tasks that can be executed by the microcontroller, which may be different from one application to another.

According to the shown embodiment of the present invention, the key also takes into account the value VAL corresponding either (FIG. 5A) to hidden value HID VAL, or (FIG. 5B) to value DEB VAL accessible in test mode. In the first case, the generated key KEY is correct and enables the microcontroller to exploit the data considered as confidential that it contains or which are available in the external memories with which it is associated. In the opposite case (FIG. 5B), the generated key W KEY is false and does not enable exploiting the data.

The hidden value of element 30 is only available after a hardware resetting of the circuit (except for the anti-fuse mode in which no resetting is possible).

As a variation, the change of values between the values contained in registers 30 and 35 is used to modify the status of value VAL, from readable to non-readable by the system.

According to an alternative embodiment, another signal than signal TCK is sampled from the test interface. For example, data input signal TDI, which will anyway be used by a person attempting to fraud in case of a need for access for a hacking attempt, may be used. The adaptation of function 28 so that it respects the described functionalities is within the abilities of those skilled in the art with software means and logic circuits.

According to another alternative embodiment, the output signal of gate 31 is also used for a resetting of the data memory (MEM RST) of the microcontroller. This optional operation is illustrated in a dotted line in FIG. 4. It is for example used if critical data are likely to be present in the RAM during the system operation. According to this variation, the memory reset signal is sampled downstream of anti-fuse element 36 to only be activated when the protection system is itself activated.

Figure 6:
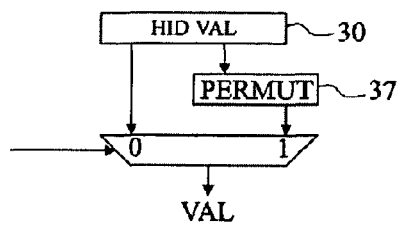
FIG. 6 partially shows a variation of the circuit of FIG. 4.

FIG. 6 illustrates a second embodiment of the present invention in which the value VAL provided to system 11 selected by multiplexer 34 is either value HID VAL contained in register 30, or this same value, transformed, for example having undergone a permutation by means of an element 37.

An advantage of the present invention is that it makes attempts of access to a component through its JTAG interface to hack quantities intended to remain secret inefficient.

In its preferred embodiment, the present invention takes advantage from the fact that most systems using keys exploit hash functions which have the property of providing a different result as soon as a value or a generation parameter of the key is different.

An advantage of the present invention is that a possible hacker does not realize that the generated key is incorrect and the microcontroller thus operates in an apparently normal way without for all this providing the elements considered as having to remain secret.

Another advantage of the present invention is that its implementation does not require significant hardware modifications. As a minimum, a non-volatile element for storing hidden value HID VAL is required.

Another advantage of the present invention is that it provides means for generating a key likely to be used by the cryptographic function (hardware or software) of the microcontroller.

Of course, the present invention is likely to have various alterations, modifications, and improvements which will readily occur to those skilled in the art. In particular, the selection of the signal originating from the JTAG interface to be exploited to activate the protection is within the abilities of those skilled in the art according to the provided detection circuit. Further, the exploitation of this detection, be it for the generation of a false key or to forbid the reading by other means in the microcontroller, depends on the application and is within the abilities of those skilled in the art. Further, the software and/or hardware implementation of the present invention based on the functional indications given hereabove is within the abilities of those skilled in the art.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for protecting a digital quantity stored in a microcontroller comprising a JTAG interface, the method comprising:
   making said digital quantity stored in the microcontroller comprising the JTAG interface dependent on a value of a parameter, wherein at least a first value of the parameter is stored in non-volatile memory in the microcontroller;
   in a first operating mode of the JTAG interface when signals are absent at an input of the JTAG interface, providing a first value of the digital quantity by combining the digital quantity with the first value of the parameter; and
   in a second operating mode of the JTAG interface, in response to signals being present at the input of the JTAG interface, activating protection of a correct value of the digital quantity by making the correct value inaccessible by combining the digital quantity with a second value of the parameter, wherein:
   the second value of the parameter is different from the first value of the parameter,
   the first value of the parameter is set during manufacturing of the microcontroller, and
   the first value of the parameter is a parameter for generating a key used by a cryptographic function of the microcontroller.

2. The protection method of claim 1, wherein the second value of the parameter different from the first value is used to generate an incorrect value of the key used by the cryptographic function when the signals are present at the input of the JTAG interface.

3. The protection method of claim 1, further comprising, when the second operating mode comprises a test mode to test the microcontroller using the JTAG interface, deactivating the protection of the first digital quantity and making the first value of the digital quantity comprising the correct value of the digital quantity accessible.

4. The protection method of claim 1, wherein the first value of the digital quantity comprises a correct value of the digital quantity that is accessible when no signals are present at the input of the JTAG interface.

5. The protection method of claim 4, wherein the correct value of the digital quantity is the key used in the cryptographic function.

6. A microcontroller comprising:
   a central processing unit;
   a non-volatile storage element;
   a JTAG interface; and
   means for implementing a function executed by the central processing unit of protection of a digital quantity stored in the microcontroller by making said digital quantity dependent on a parameter stored in the non-volatile storage element, wherein
   in a first operating mode of the JTAG interface when signals are absent at an input of the JTAG interface, a correct value of the digital quantity is accessible as a first value of the digital quantity generated based on a first value of the parameter; and
   in a second operating mode of the JTAG interface, in response to signals being present at the input of the JTAG interface, activating protection of a correct value of the digital quantity by making the correct value inaccessible by combining the digital quantity with a second value of the parameter, wherein:
   the second value of the parameter is different from the first value of the parameter,
   the first value of the parameter is set during manufacturing of the microcontroller, and
   the first value of the parameter is a parameter for generating a key used by a cryptographic function of the microcontroller.

7. The microcontroller of claim 6, wherein the first value of the parameter is stored in the non-volatile storage element and is only accessible in the absence of signals at the input of the JTAG interface.

8. The microcontroller of claim 6, wherein said cryptographic function is implemented by means of an element of detection of the presence of a signal at the input of the JTAG interface to condition a value of the parameter provided to generate said key.

9. The microcontroller of claim 6, further comprising an element that makes the correct value of the digital quantity accessible by deactivating the protection of the first digital quantity, when the second operating mode comprises a test mode to test the microcontroller using the JTAG interface, wherein the correct value of the digital quantity is used in the test mode.

10. The microcontroller of claim 6, wherein the parameter is stored in the non-volatile storage element at a time of manufacturing of the microcontroller.

11. A method for protecting a digital quantity stored in a microcontroller comprising a JTAG interface, the method comprising:
    making the digital quantity stored in the microcontroller comprising the JTAG interface dependent on a value of a parameter, wherein at least a first value of the parameter is stored in non-volatile memory in the microcontroller;
    in a first operating mode, providing a first value of the digital quantity by combining the digital quantity with the first value of the parameter; and
    in a second operating mode, in response to signals being present at an input of the JTAG interface, providing a second value of the digital quantity by combining the digital quantity with a second value of the parameter, wherein:
    the second value of the parameter is different from the first value of the parameter,
    the first value of the parameter is set during manufacturing of the microcontroller, and
    the first value of the parameter is a parameter for generating a key used by a cryptographic function of the microcontroller.

12. The method of claim 11, wherein the first value of the digital quantity is inaccessible when signals are present at the input of the JTAG interface.

13. The method of claim 11, wherein the first operating mode comprises a normal operating mode and the second operating mode comprises a test mode.

14. The method of claim 11, wherein the first value of the digital quantity is a correct value of the digital quantity.

15. The method of claim 11, further comprising generating the second value of the parameter from the first value of the parameter.

16. The method of claim 11, further comprising using the first and second values of the digital quantity as respective parameters of a key of a cryptographic function, wherein only the first value of the digital quantity is a correct parameter of the key.

* * * * *